United States Patent
Qi et al.

(10) Patent No.: US 11,173,545 B2
(45) Date of Patent: Nov. 16, 2021

(54) HIERARCHICAL POROUS METALS WITH DETERMINISTIC 3D MORPHOLOGY AND SHAPE VIA DE-ALLOYING OF 3D PRINTED ALLOYS

(71) Applicant: Lawrence Livermore National Security, LLC, Livermore, CA (US)

(72) Inventors: Zhen Qi, Tracy, CA (US); Juergen Biener, San Leandro, CA (US); Wen Chen, Livermore, CA (US); Eric Duoss, Dublin, CA (US); Christopher Spadaccini, Oakland, CA (US); Marcus A. Worsley, Hayward, CA (US); Jianchao Ye, Tracy, CA (US); Cheng Zhu, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 97 days.

(21) Appl. No.: 15/790,810

(22) Filed: Oct. 23, 2017

(65) Prior Publication Data
US 2019/0118264 A1 Apr. 25, 2019

(51) Int. Cl.
*B22F 3/11* (2006.01)
*B33Y 10/00* (2015.01)
(Continued)

(52) U.S. Cl.
CPC ........... *B22F 3/1146* (2013.01); *B22F 3/1115* (2013.01); *B22F 3/1121* (2013.01);
(Continued)

(58) Field of Classification Search
None
See application file for complete search history.

(56) References Cited

U.S. PATENT DOCUMENTS 7,902,526 B2  3/2011  Kim et al.
2013/0188245 A1  7/2013  Jaiswal
(Continued)

FOREIGN PATENT DOCUMENTS

KR   20140037022 A   3/2014

OTHER PUBLICATIONS

Izdebska et al (Chapter 3 Author Husovska), Printing on Polymers Fundamentals and Applications, 2016, Elsevier, chapter 3 Printing Ink Formulations pp. 41-55 (Year: 2016).*

(Continued)

*Primary Examiner* — Anthony J Zimmer
*Assistant Examiner* — Michael J Kachmarik
(74) *Attorney, Agent, or Firm* — Harness, Dickey & Pierce, P.L.C.

(57) ABSTRACT

The present disclosure relates to a method for forming a three dimensional, hierarchical, porous metal structure with deterministically controlled 3D multiscale pore architectures. The method may involve providing a feedstock able to be applied in an additive manufacturing process, and using an additive manufacturing process to produce a three dimensional (3D) structure using the feedstock. The method may involve further processing the 3D structure through at least a de-alloying operation to form a metallic 3D structure having an engineered, digitally controlled macropore morphology with integrated nanoporosity.

18 Claims, 7 Drawing Sheets

(51) Int. Cl.
B33Y 40/00 (2020.01)
B22F 10/10 (2021.01)
B22F 10/38 (2021.01)
B22F 10/62 (2021.01)

(52) U.S. Cl.
CPC ............ *B22F 10/10* (2021.01); *B22F 10/38* (2021.01); *B22F 10/62* (2021.01); *B33Y 10/00* (2014.12); *B33Y 40/00* (2014.12); *B22F 2301/255* (2013.01); *B22F 2998/10* (2013.01)

(56) References Cited

U.S. PATENT DOCUMENTS

| | | | |
|---|---|---|---|
| 2016/0167132 A1* | 6/2016 | Panat | H01M 4/13 419/53 |
| 2016/0199935 A1 | 7/2016 | Chen et al. | |
| 2017/0110717 A1 | 4/2017 | Tolbert et al. | |
| 2017/0181291 A1* | 6/2017 | Bell | C09D 11/52 |
| 2017/0252974 A1* | 9/2017 | Ng | B29C 64/165 |

OTHER PUBLICATIONS

Qi "Hierarchical Nest-Network Nanostructure by Dealloying" ACS Nano, 2013 (Year: 2013).*

Gibosn et al, Additive Manufacturing Technologies Chapter 10 Direct Write Technologies, Springer, 2010 (Year: 2010).*

Takeshi Fujita, Hierarchical nanoporous metals as a path toward the ultimate three-dimensional functionality, Science and Technology of Advanced Materials published Oct. 5, 2017 (Year: 2017).*

Corcoran, Effects of Metallurgical Variables on Dealloying Corrosion, ASM Handbook, vol. 13A: Corrosion: Fundamentals, Testing, and Protection, (Year: 2003).*

Heinl, Cellular Ti-6Al-4V structures with interconnected macro porosity for bone implants fabricated by selective electron beam melting, (Year: 2008).*

International Search Report and Written Opinion from corresponding International Application No. PCT/US2018/053844, dated Feb. 12, 2019, 8 pages.

LEE—"Developing Monolithic Nanoporous Gold with Hierarchical Bicontinuity Using Colloidal Bijels" J Phys Chem. Lett., 2014, 5, 809.

Qi—"Hierarchical Nested-Network Nanostructure by Dealloying" ACS Nano, 2013, 7, 5948.

Zhang—"Nanoporous bimetallic Pt-Au alloy nanocomposites with superior catalytic activity towards electro-oxidation of methanol and formic acid Nanoscale", 2011, 3, 1663-1674.

Zhang—"Nanoporous Gold Ribbons with Bimodal Channel Size Distributions by Chemical Dealloying of Al—Au Alloys" J. Phys. Chem. C 2009, 113,4, 1308-1314.

* cited by examiner

HIERARCHICAL POROUS METALS WITH DETERMINISTIC 3D MORPHOLOGY AND SHAPE VIA DE-ALLOYING OF 3D PRINTED ALLOYS

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to the formation of porous metals, and more particularly to the formation of 3D periodic porous materials having an engineered, hierarchical, multi-porosity structure.

BACKGROUND

The statements in this section merely provide background information related to the present disclosure and may not consitute prior art.

Figure 1:
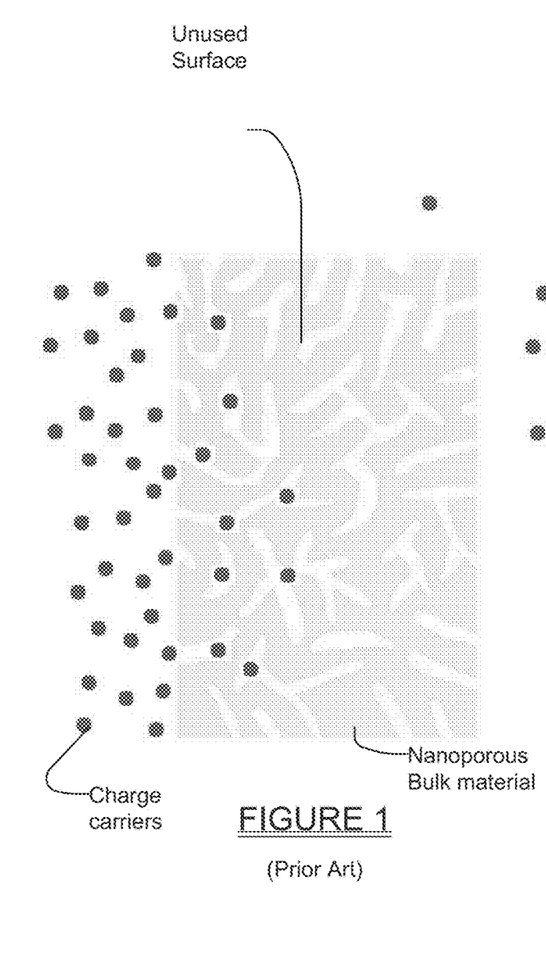
FIG. 1 is a diagram illustrating the mass transport limitations of prior art non-hierarchical nanoporous materials formed through conventional de-alloying methods.

Conventionally, nanoporous metals with uniform single level porosity have been fabricated by de-alloying methods from an alloy precursor. The performance of these materials in many applications often suffers from mass transport limitations, which is specifically true for monolithic macroscopic nanomaterials. In the extreme case, mass transport limitations limit reactions to the geometrical surface of the macroscopic monolithic material, thus leaving the majority of the internal surface within the nanoporous bulk material unused (see, for example FIG. 1). This limitation can be overcome by introducing a hierarchical structure with at least two levels of pore sizes: 1) large pores which act as mass transport "highways" that allow the reactants to diffuse to small pores, while 2) nanosized pores provide high surface area and thus are responsible for functionality.

Hierarchical nanoporous gold has been realized using template methods, for example by injecting a target metal salt to replicate the structure of a hierarchical template (Lee et al. "Developing Monolithic Nanoporous Gold with Hierarchical Bicontinuity Using Colloidal Bijels" J Phys Chem. Lett., 2014, 5, 809). However, pore size distributions and sample dimensions are determined by the template which is difficult to tune at different levels of structures. Specifically, anisotropic templates are difficult to realize by nature's self-organization and self-assembly methods. For example, Lee and his co-workers (Lee et al., supra) used colloidal Bijels as template materials. By filling the template with HAuCl4 and AgNO3 solutions with the desired composition, and then followed up with an annealing process to form the alloys and remove the template. Finally, a de-alloying process was used to remove Ag from AgAu alloys.

Bulk hierarchical nanoporous gold has also been prepared using a multi-step corrosion-deposition-annealing-de-alloying process (see Qi et al. "Hierarchical Nested-Network Nanostructure by De-alloying" ACS Nano, 2013, 7, 5948). The corrosion-deposition-annealing-de-alloying process is limited by the availability of suitable starting alloys. Solid solution alloys which present only a tiny fraction of binary alloys are so far the only reported system for this process. For example, Qi and Weissmueller (Qi et al., supra) chose a dilute AgAu alloy with the gold content of 5 atomic percent as a starting alloy, whereas the normal gold composition range for de-alloying is 20-50 atomic percent. They then used an electrochemically controlled de-alloying process to partially remove Ag from the dilute AgAu alloy to form a nanoporous AgAu alloy with a high residual Ag content, which is enough to perform a second de-alloying process. It should be noted that the normal composition range for de-alloying cannot achieve such a high residual Ag concentration, and therefore it is not possible to perform a second de-alloying process. The obtained nanoporous AgAu alloy was annealed at 300° C. for 3 hours to form the upper hierarchy structure with a ligament size of ~200 nm. A second de-alloying process introduces the lower level hierarchical structures with a size of ~20 nm. However, this process also does not allow for the realization of anisotropic pore architectures required for directed mass transport.

SUMMARY

In one aspect the present disclosure relates to a method for forming a three dimensional, hierarchical, porous metal structure with deterministically controlled 3D multiscale porosities. The method may comprise providing a feedstock able to be applied in an additive manufacturing process, and using an additive manufacturing process to produce a three dimensional (3D) structure using the feedstock. The method may involve further processing the 3D structure through at least one annealing operation to form an alloyed 3D structure having selected, differing porosities processing the 3D structure through at least a de-alloying operation to form an alloyed 3D structure having selected, differing porosities.

In another aspect the present disclosure relates to a method for forming a three dimensional, hierarchical, porous metal structure with deterministically controlled 3D multiscale porosities. The method may comprise forming an ink from a plurality of differing metal powders and a binder, the ink being able to be applied through a nozzle in an additive manufacturing process. The method may further involve using an additive manufacturing process to produce a three dimensional (3D) structure in a layer-by-layer process using the ink. The method may further involve annealing the 3D structure to remove the binder, and to form an alloyed 3D structure. The method may further involve processing the alloyed 3D structure through a de-alloying operation to form an engineered, digitally controlled macropore morphology with integrated nanoporosity.

In still another aspect the present disclosure relates to a method for forming a three dimensional, hierarchical, porous metal structure with deterministically controlled 3D multiscale porosities. The method may comprise providing an ink as a feedstock which is able to be applied in an additive manufacturing process. The method may further include using an additive manufacturing process to produce a three dimensional (3D) structure in a layer-by-layer process using the ink. The method may further involve annealing the 3D structure at a predetermined temperature for a predetermined time to remove the organic binder, to form an alloyed 3D structure. The method may still further involve processing the alloyed 3D structure through a de-alloying operation to produce a finished 3D part having a hierarchical pore morphology with integrated nanoporosity.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present invention uses an additive manufacturing operation, in one example a DIW additive manufacturing process, to fabricate hierarchical nanoporous metal foams with deterministically controlled, application specific, 3D multiscale pore architectures. Arbitrary macroscopic architectures and sample shapes can be printed according to the application requirements. Moreover, the structure of two, three, or more distinct levels of porosity can be tuned independently which enables application specific multiscale architectures of virtually any geometric 3D shape.

Referring to FIGS. 2-5, an additive manufacturing process, in this example a direct ink writing (DIW) additive manufacturing method, may be used to deposit filaments of rheologically tuned alloy "inks" made from desired metal powder mixtures, in a predefined geometry, for example a net-shaped, porous form. At FIG. 2, a metal particle mixing operation is performed. In this example gold clay 12 and silver clay 14 are mixed together as powders with a solvent(s) acting as an organic binder 16. However, it will be appreciated that other combinations of metal powders may be selected, and the present disclosure is not limited to use with only Au and Ag powders. In this example, however, the specific quantities and/or ratio of Au and Ag (e.g., metal powders) may be selected, along with the quantity of organic binder(s) 16, and mixed together as colloids/particles to tune the rheological properties of the composition. The composition forms an ink 18 after being mixed. Thus, the operations performed in FIG. 2 may be thought of as a "mixing" or powdered metal ink preparation process. Changes to the metal powder mixing ratio (e.g., Au powder from Au clay 12 and Ag powder from Ag clay 14) allow adjustment of the metal alloy composition formed during a subsequent DIW/annealing process. Alternatively, premade alloy particles with the desired metal component composition can be mixed with the binder (i.e., solvent) 16 to prepare the alloy ink.

Figures 2, 3:
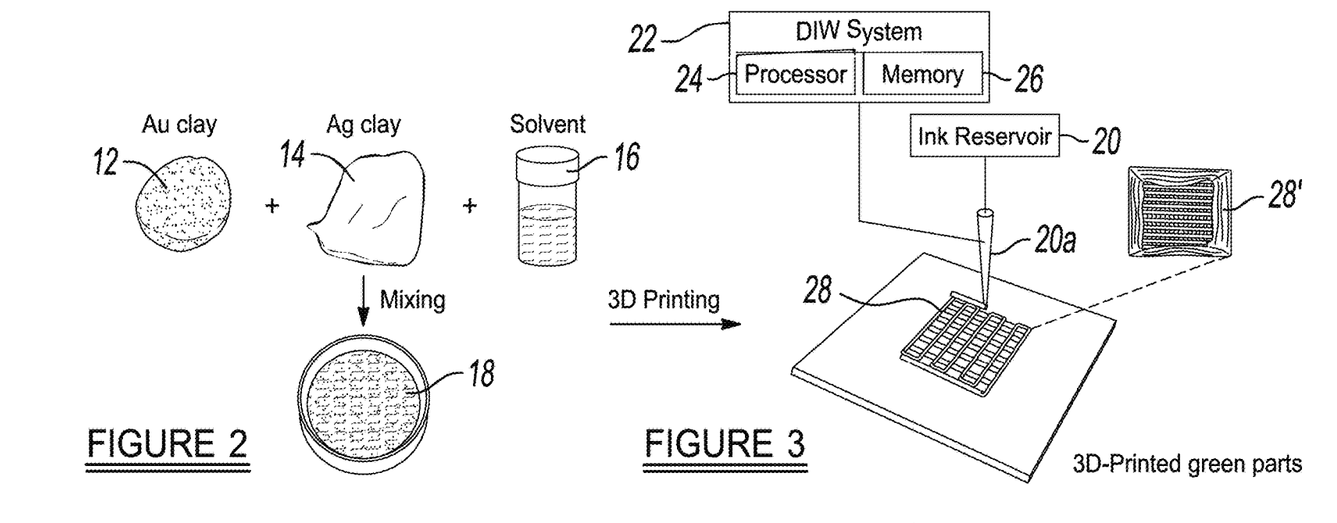
FIG. 2 shows a simplified diagram illustrating how various metal particle clays, together with a solvent, may be mixed together to form an ink that may be used in a direct ink writing (DIW) process.
FIG. 3 is a simplified diagram of using the ink shown in FIG. 2 in a DIW operation to form a 3D structure in a layer-by-layer process.

In FIG. 3, an ink reservoir 20 may be used to hold the ink 18 and supply the ink to a nozzle 20a of a DIW system 22. The present disclosure is not limited to any particular construction of DIW system, but in this example the DIW system 22 includes a computer controlled processor 24 and a memory 26. The DIW system uses the nozzle 20a to form a 3D printed, structure 28 in a "layer-by-layer" fashion. The 3D structure 28 formed initially by the DIW system 22 may be termed a "green part" to indicate that further manufacturing operations are to be performed on the parts. Illustration 28' in FIG. 3 illustrates a plan view showing one example of the porosity of the 3D structure 28 formed by printed metal particle ink filaments that form a lattice-like structure.

In this example the DIW operation using the Ag—Au alloy forming metal particle mixture (i.e., ink 18) forms an extrusion-based, room temperature manufacturing process. The Ag—Au ink 18 in this example was housed in a 3 cm×3 cm syringe barrel (EFD) (shown as nozzle 20a) attached by a Luer-Lok to a smooth-flow tapered nozzle (200 microns inner diameter, "d"). An air-powered electronically controlled fluid dispenser, in this example the ULTIMUS™ V, EFD (available from the Nordson Corp. of Westlake, Ohio), provided the appropriate pressure to extrude the ink 18 through the nozzle 20a. The extrusion process may be controlled by controlling the extrusion pressure and printing speed during the writing operation. The target patterns forming the 3D Au—Ag particle structure 28 in this example were printed using an x-y-z 3-axis air bearing positioning stage (model ABL 9000, available from Aerotech, Inc. of Pittsburgh, Pa.), whose motion was controlled by writing the appropriate G-code commands. The 3D Ag—Au metal particle structure 28 was printed in a layer-by-layer scheme onto silicon wafers with a nozzle height (h) of 0.7 d to ensure moderate adhesion to the substrate and between adjacent printed layers. This process enables the 3D Au—Ag metal particle structure 28 to be printed with virtually any 3D shape.

Figure 4:
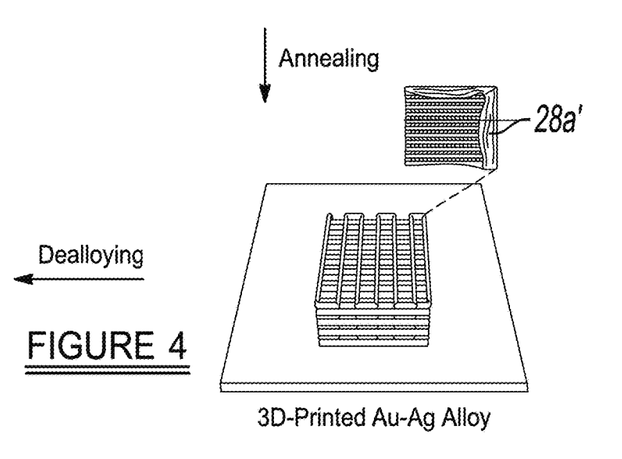
FIG. 4 shows a 3D printed Au—Ag alloy structure after an annealing operation has been performed to burn off the binder material and to alloy the metal components of the ink.

Referring to FIG. 4, after the 3D Au—Ag metal particle structure 28 (i.e., green part) is printed using the DIW process, the structure may be heated to anneal it, to form the alloy by interdiffusion of the different metal particles, and burn off the organic binder 16. Depending on the alloy melting point, the annealing temperature varies. Generally, anywhere from 0.99-0.7 of the melting temperature of the alloy to be formed may be used as the annealing temperature. The annealing time may also be varied as this variable depends on the particle size used in the alloy, and the annealing temperature. The annealing time may thus range from 1 hour to 24 hours. Smaller particles and higher annealing temperatures require a shorter time to form a homogenous alloy. In this example the annealing was performed by heating the structure 28 to 850° C. using a heating rate of 10° C./minute, and annealed at this temperature for twelve hours to remove the organic binder 16 and allow the Ag and Au to form an alloy. The annealed structure 28a' is shown in FIG. 4 as well.

Figure 5:
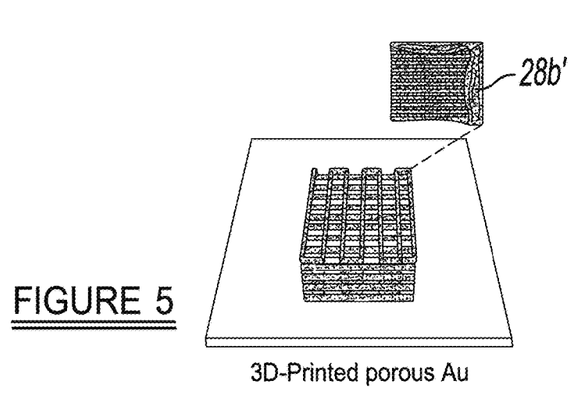
FIG. 5 shows a 3D printed, hierarchical porous structure created through a de-alloying process, which leaves a 3D structure having a plurality of distinct porosity length scales

As indicated in FIG. 5, the annealed structure 28a' is then de-alloyed. The de-alloying process may be performed by any suitable process (e.g., free-corrosion, electrochemical de-alloying, etc.). The de-alloying process is often carried out in aqueous solution for free and electrochemical de-alloying processes. Various types of acid and alkaline solution with the concentration from 1% to its saturated form can be used for a free corrosion process. For an electrochemical de-alloying process, besides the acid and alkaline solution, a neutral solution such as NaCl, KCl, etc., with a concentration from 0.1 M to its saturated form may be selected for electrochemical de-alloying process controlled by a potentiostat or power source (battery) with two or three electrode setups. For certain elements to form nanoporous structures such as Si, Ti, V, Cr, Fe, Co, Ga, Sn, Ta, Pb, and Bi, a melt de-alloying process may be used along with choosing a metallic element which does not mix with the target element.

Figure 6:
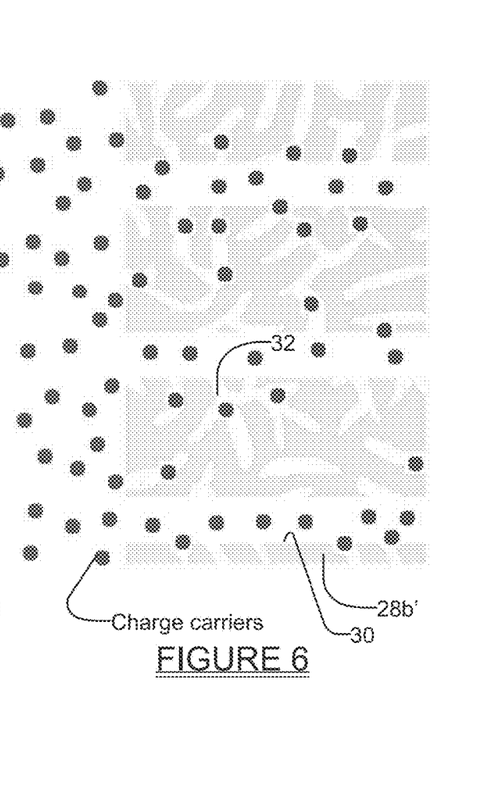
FIG. 6 shows a cross sectional view of a portion of the hierarchical 3D structure shown in FIG. 5 to illustrate the increase in mass transport and accessible contact area of the material for charge carriers, as compared to the prior art 3D structure of FIG. 1.

The melt de-alloying process starts with the target alloy by putting it into a melting metal for certain time, and then taking it outside. Next, the treated piece may be exposed to an etching solution to remove the unwanted elements. The de-alloying in this example was performed by submerging the annealed structure 28a' in concentrated HNO3 solution for two days. In this example the process described herein resulted in a hierarchical metal foam morphology, represented by illustration 28b', with three distinct levels of pores (i.e., three distinct sections having differing porosities). FIG. 6 shows a simplified cross-sectional illustration of a portion of the 3D structure 28b' of FIG. 5 to illustrate the hierarchical pore architecture of the structure. Portions 30 of the 3D structure 28b' may form macropores that operate as engineered mass transport "highways" or paths, while portions 32 form nanopores that provide the increased interior surface area that is exposed to reactants (ions or neutral species), and thus helps to provide high (electro)catalytic reactivity.

Figure 7:
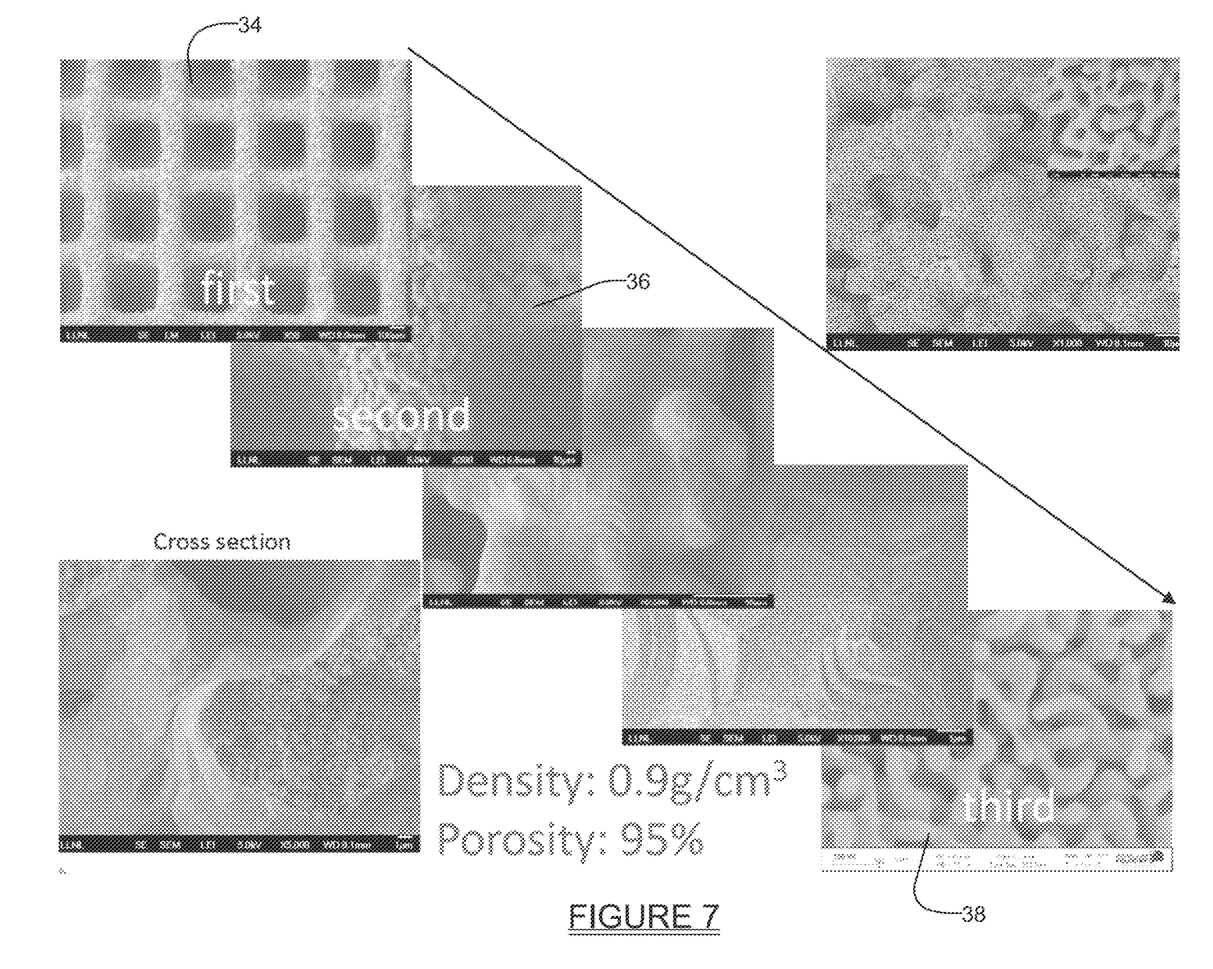
FIG. 7 shows Scanning Electron Micrographs at different magnifications of an example 3D structure created using the teachings of the present disclosure, in which the 3D structure has three distinct porosity length scales.
Figure 8:
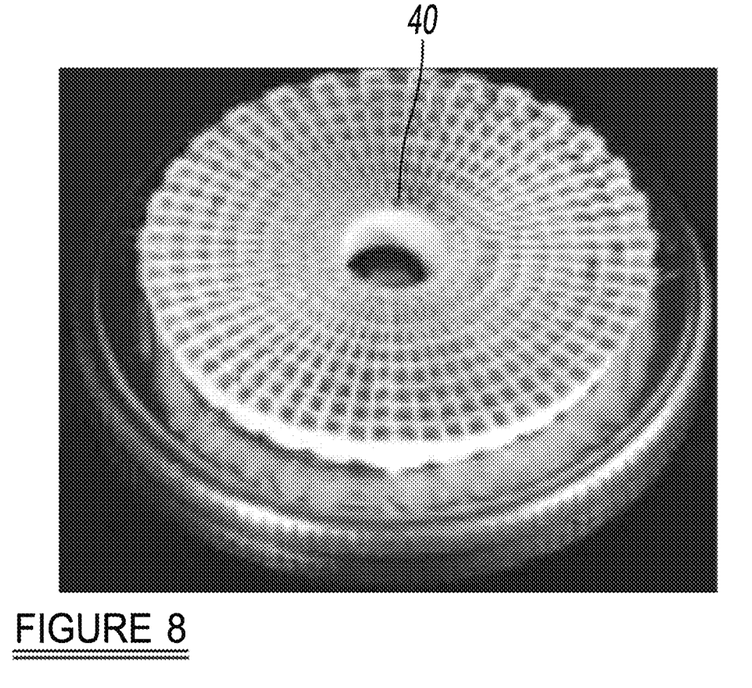
FIGS. 8-11 illustrate examples of complexly shaped 3D structures that may be created using the teachings of the present disclosure.
Figure 9:
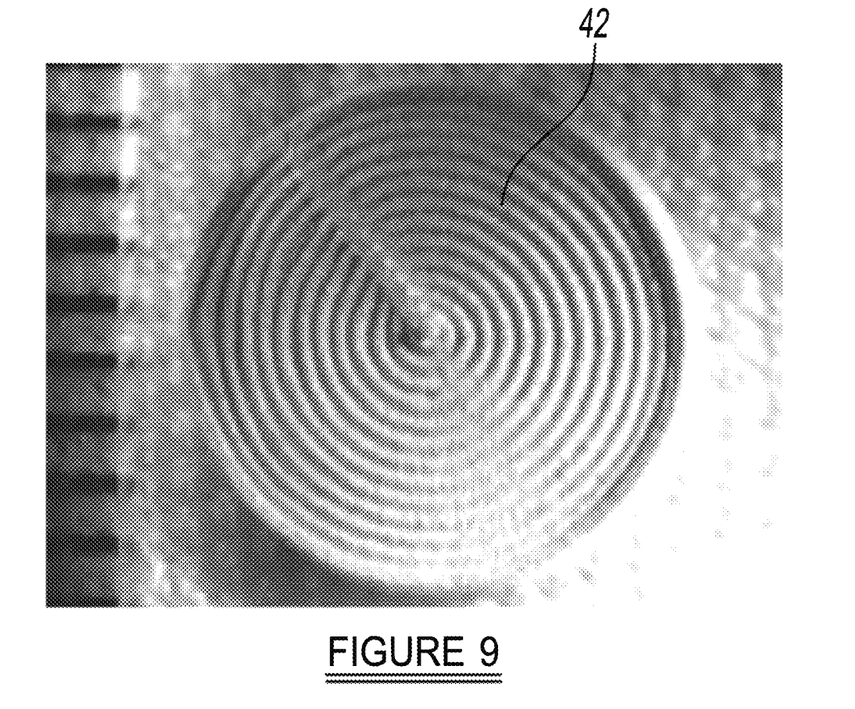
Figure 10:
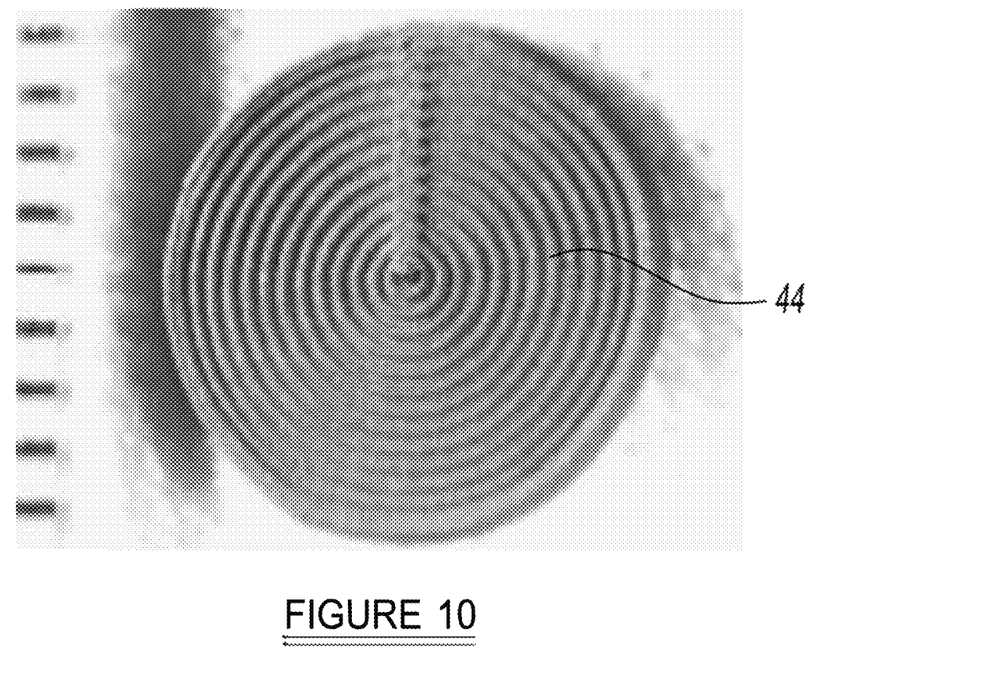
Figure 11:
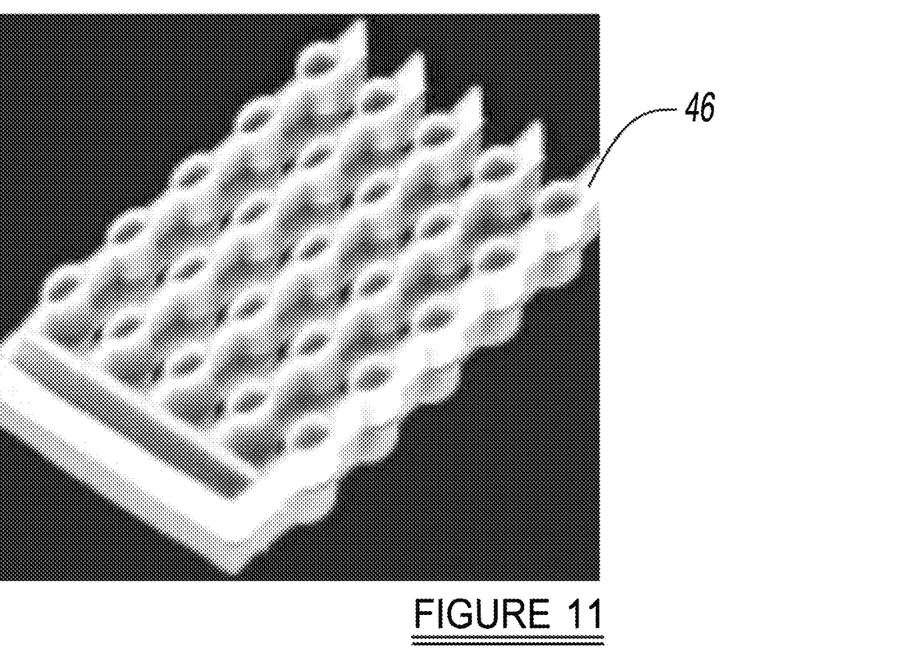

The system and method disclosed herein may be used to fabricate a 3D structure having multiple levels of porosity, and in one specific example three levels of porosity with a total porosity of 95% and a surface area of 5 m$^2$/g, as shown in FIG. 7. FIG. 7 illustrates a portion of a 3D structure formed using the system and method of the present disclosure having a distinct first level macroscale porosity 34, a distinct second level mesoscale porosity 36 and a distinct third level nanoscale porosity 38, while having a total porosity of 95% and a surface area of 5 m$^{-2}$/g. If desired, the engineered macroscale porosity can be made anisotropic to direct mass transport in applications that require directional mass transport (for example flow battery electrodes). The system and method of the present application may be especially useful in enabling manufacture of complex 3D structures that would be difficult and/or impossible to create using previously available manufacturing techniques. Further examples are 3D structures 40-46 made using the teachings of the present disclosure as shown in FIGS. 8-11 respectively.

Figure 12:
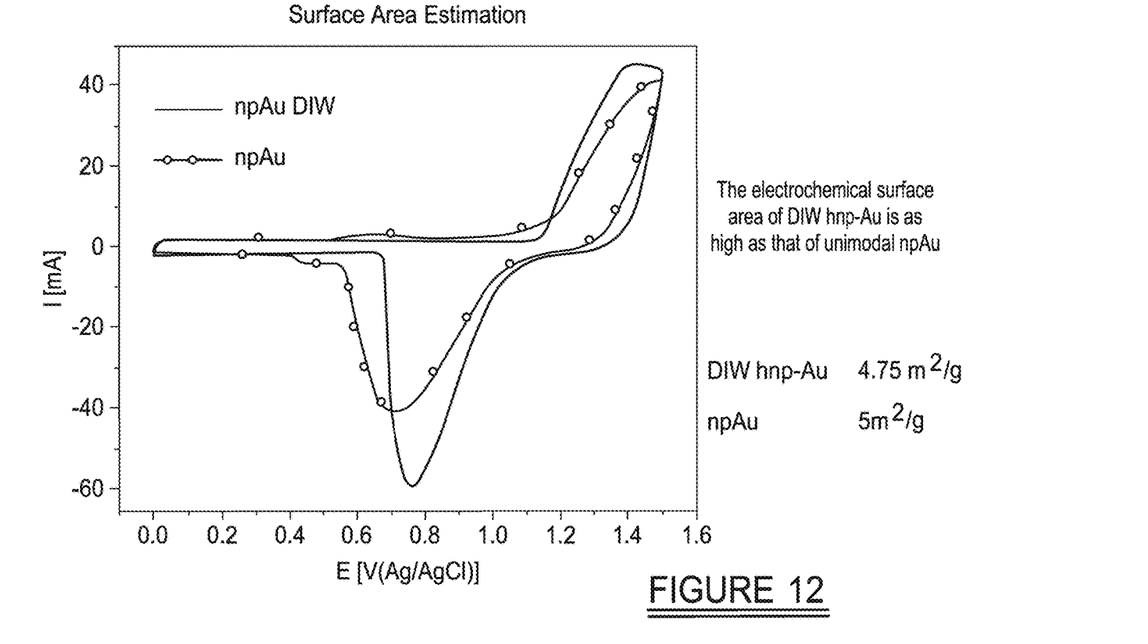
FIG. 12 shows a cyclic voltammetry graph illustrating the electrochemical surface area of a hierarchical 3D structure created using the teachings of the present invention compared to a conventionally created unimodal 3D structure with the same thickness.
Figure 13:
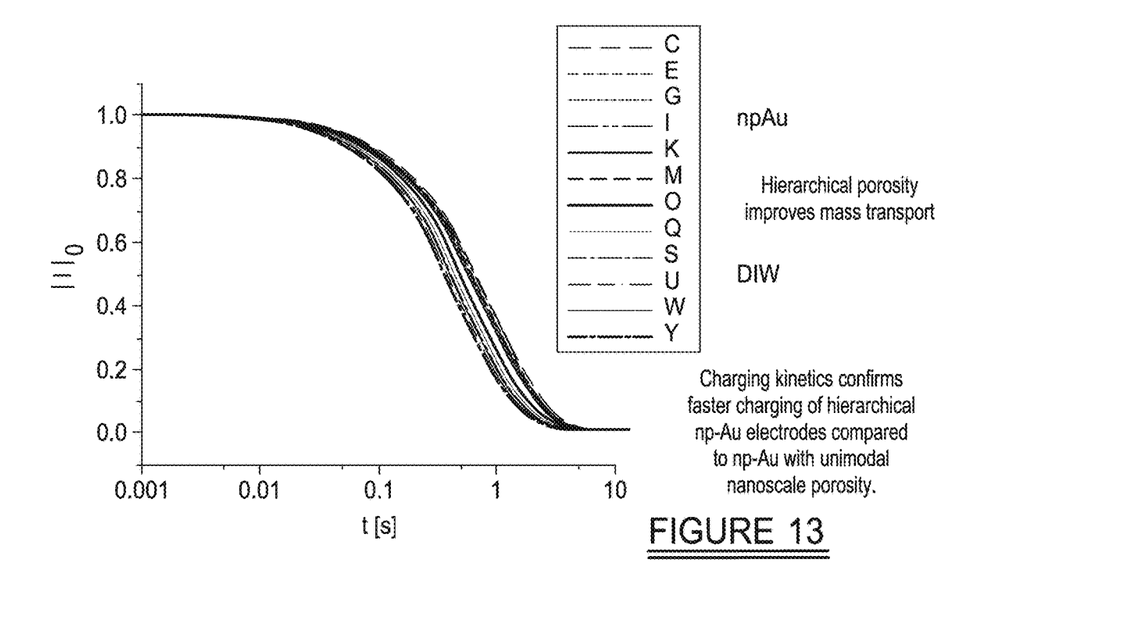
FIG. 13 shows a graph comparing the electrical current response of hierarchical (solid lines) and non-hierarchical (dash lines) nanoporous gold electrodes in response to a sudden change of the applied electrochemical potential from $E_i=0$ V to $E_F$ wherein the different colors from top to bottom represent different values of $E_F$ ranging from 0.1V to 0.6V; it can be seen that the hierarchical structure charges always faster compared to the unimodal nanoporous gold.

FIG. 12 shows a graph illustrating that the electrochemically accessible surface area of a 3D structure created using the teachings of the present disclosure is similar to that of a conventional unimodal 3D structure. FIG. 13 shows a graph illustrating faster charging response as a consequence of a sudden jump of the applied electrochemical potential of 3D structures created using the teachings of the present disclosure, as compared to that of a conventional unimodal 3D structure.

Figure 14:
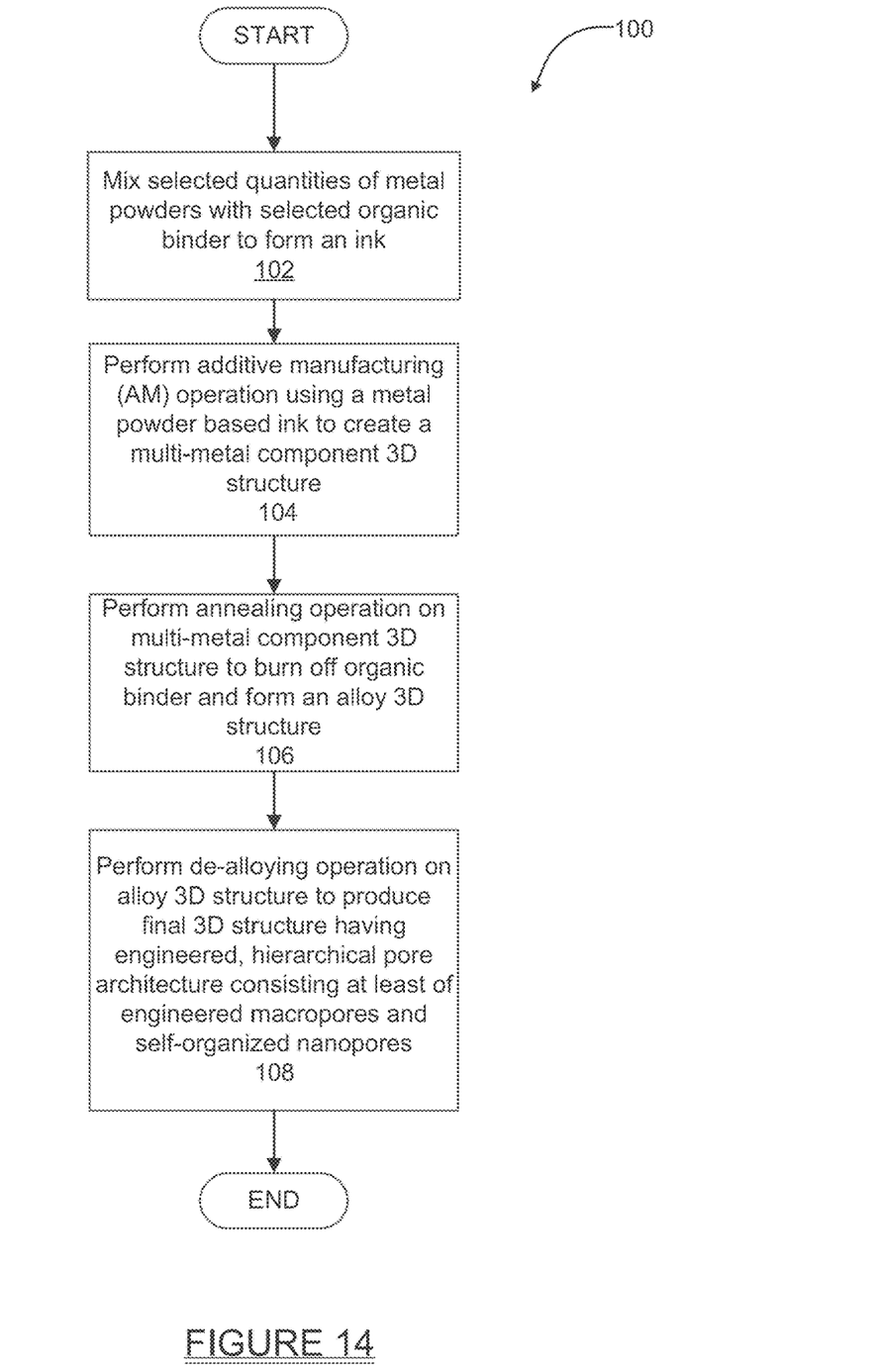
FIG. 14 is a high level flowchart summarizing basic operations that may be performed in forming hierarchical nanoporous metal foams and other 3D structures.

Referring to FIG. 14, the above described operations performed using the teachings of the present disclosure are summarized in flowchart 100. At operation 102, if an ink is to be formed (i.e., rather than using a pre-prepared feedstock), then the ink may be formed by mixing selected quantities of two or more powdered metals together with an organic binder. At operation 104 an additive manufacturing operation is then performed to create a 3D metal particle structure. At operation 106 an annealing operation is performed to burn off the organic binder and to form the alloy 3D structure. At operation 108 a de-alloying operation is then performed on the annealed 3D structure which creates a 3D structure having a hierarchical metal foam architecture with several distinct pore sizes.

The present invention thus uses DIW additive manufacturing to fabricate hierarchical nanoporous metal foams with deterministically controlled 3D multiscale porosities. Arbitrary yet mechanically robust 2D or 3D shapes can be printed according to the specific needs of the application. Moreover, the printed structure with its two, three or more distinct levels of porosity can be tuned independently, in part by using the DIW operation, in part by controlling the ink's organic binder content, in part by controlling annealing of the structure and in part by controlling de-alloying of the structure, to create different architectures for different layers or sections of the 3D structure, which enables application specific multiscale architectures to be created. The ability of the present disclosure to create 3D metal foams with deterministic shapes and a macroscale porosity is expected to have significant impact in the fields of energy storage for batteries, catalysis, and more. The methods disclosed herein can be used to create structures such as filaments, films, and virtually any other type of three dimensional, monolithic or spanning free-form structures, where it is desired to have both high surface area and high electrical conductivity, in addition to two or more distinct pore size length scales.

It will also be appreciated that while the present disclosure has described a DIW process as being one example of the specific process being used to apply the ink 18, other fabrication processes in addition to DIW may be used as well. For example, the ink 18 may be used in more traditional extrusion-based processes where the architecture is not controlled by the motion of the nozzles with respect to the XYZ stage, but by the shape of the nozzle itself. Furthermore, the present disclosure is not limited to use with only a DIW process; virtually any form of additive manufacturing/3D printing method/process, for example and without limitation, Selective Laser Sintering, Selective Laser Melting, Binder Powder Bed Printing, Fused Deposition Modeling, Projection Microstereolithography, Electrophoretic Deposition, Screen Printing, Inkjet Printing, and other laser melting, sintering, or deposition processes may be used in place of a DIW process. Virtually any process capable of producing multi-metal component parts with a digitally controlled macropore architecture, which may then be annealed to form the alloy, and then de-alloyed to create the functional nanoporosity, is contemplated by the present disclosure.

It will also be appreciated that nanoporous metals can be prepared from typical binary and ternary alloys, or even from multi-composition alloys (i.e., more than three different elements). The less noble elements have a lower standard electrode potential compared with the more noble elements for aqueous de-alloying process. Typical elements that can be used as less noble components are the following: Li, Na, Mg, Al, Si, K, Ca, Sc, Ti, V, Cr, Mn, Fe, Co, Ni, Cu, Zn, Ga, Ge, Sr, Zr, Nb, Mo, Cd, In, Sn, Pb, Bi and most or non-radioactive rare earth elements. Typical elements for the more noble elements to form nanoporous metals are: Si, Ti, V, Cr, Mn, Fe, Co, Ni, Cu, Ga, Ge, Nb, Mo, Ru, Rh, Pd, Ag, Cd, Sn, Ta, W, Os, Ir, Pt, Au, Pb, and Bi. Other elements such as Be, B, P, S, As, and Se can be used as additive elements. The typical element compositional range for the less noble element of the alloy is from 5 to 99 atomic percent and the rest are the more noble elements. If the alloy particles are available, then it would be possible to prepare the hierarchical nanoporous metals directly by using the alloy powders and binders to form the macroscopic architecture.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for forming a three dimensional, hierarchical, porous metal structure with a deterministic 3D multiscale porous architecture, the method comprising:
    providing a rheologically tuned ink forming a metal powder mixture, usable as feedstock and able to be applied in an additive manufacturing process, to make a metal structure;
    using an additive manufacturing process to produce a three dimensional (3D) structure using the feedstock; and
    subsequent to completing the additive manufacturing process and printing all the layers of the 3D structure, further processing the 3D structure through a single de-alloying operation including submerging the 3D structure in an aqueous solution for a predetermined time period, to form a de-alloyed 3D structure having three differing first, second and third porosities within the 3D structure, and wherein the second porosity includes pores which are smaller than pores of the first porosity, and the third porosity includes pores which are smaller than those of the second porosity, and wherein the third porosity forms a nanoscale porosity.

2. The method of claim 1, wherein the providing a feedstock comprises providing an alloy powder.

3. The method of claim 1, wherein providing a feedstock comprises forming an ink from a plurality of different metal powders and a binder.

4. The method of claim 1, wherein using an additive manufacturing process comprises using a direct ink writing (DIW) process.

5. The method of claim 1, wherein using an additive manufacturing process comprises using at least one of:
a direct ink writing (DIW) process.

6. The method of claim 3, wherein the forming an ink comprises forming an ink from two metal powders.

7. The method of claim 6, wherein the forming an ink comprises forming an ink from silver powder and gold powder.

8. The method of claim 6, wherein the forming an ink comprises forming the ink from two metal powders and also from an organic binder.

9. The method of claim 1, wherein the further processing of the 3D structure through at least a de-alloying operation comprises performing an annealing operation on the 3D structure prior to performing the de-alloying operation.

10. The method of claim 9, wherein the performing an annealing operation on the 3D structure comprises heating the 3D structure to 0.99-0.7 of the melting temperature of an alloy to be formed as the alloyed 3D structure.

11. The method of claim 10, further comprising maintaining the 3D structure heated for between 1 hour to 24 hours.

12. A method for forming a three dimensional, hierarchical, porous metal structure with a deterministic 3D multi-scale hierarchical pore architecture, the method comprising:
forming a rheologically tuned ink from a mixture of a plurality of differing metal powders and a binder, the ink being able to be flowed through a nozzle in an additive manufacturing process to form a plurality of filaments;
using an additive manufacturing process to produce a three dimensional (3D) structure in a layer-by-layer process using the rheologically tuned ink deposited as the plurality of filaments;
subsequent to completing the layer-by-layer process and printing all the layers of the 3D structure, annealing the 3D structure to remove the binder, and to form an alloyed 3D structure; and
further processing the alloyed 3D structure through a single de-alloying operation including submerging the 3D structure in one of an acid aqueous solution or an alkaline aqueous solution having a concentration of from 1% to its saturated form for a time period, with or without an applied potential, to form a hierarchical nanoporous 3D structure within the 3D structure, such that the 3D structure has a deterministic first morphology having a first porosity, and further including two additional porosities which differ from the first porosity morphology and with one another, with one of said two additional porosities including a nanoporosity.

13. The method of claim 12, wherein the forming an ink comprises forming an ink from a plurality of metal powders and a binder.

14. The method of claim 12, wherein the annealing comprises heating the 3D structure to 0.99-0.7 of the melting temperature of an alloy to be formed as the alloyed 3D structure.

15. The method of claim 14, wherein the annealing further comprises heating the 3D structure for a predetermined time period from between 1 hour to 24 hours.

16. A method for forming a three dimensional, hierarchical, porous metal structure with a deterministic 3D multi-scale, hierarchical porosity, the method comprising:
providing a rheologically tuned metal powder ink made from a metal powder mixture to form a flowable feedstock which is applied in an additive manufacturing process as a plurality of filaments to form layers of a three dimensional (3D) part being formed, the rheologically tuned metal powder ink including a binder;
using an additive manufacturing process to produce a three dimensional (3D) structure in a layer-by-layer process using the rheologically tuned metal powder ink applied as the plurality of filaments;
subsequent to printing all the layers of the 3D structure, annealing the 3D structure at a predetermined temperature for a predetermined time to remove the organic binder, and to form an alloyed 3D structure; and
further processing the alloyed 3D structure through a single de-alloying operation including submerging the alloyed 3D structure in at least one of an acid aqueous solution or an alkaline aqueous solution having a concentration of from 1% up to its saturated form for a time period, with or without an applied potential to produce a finished 3D part having a hierarchical metal foam morphology with integrated, additional first, second and third differing porosities within the 3D structure, wherein the first, second and third porosities differ from one another with the second porosity having pores smaller than pores of the first porosity, and the third porosity having pores smaller than pores of the second porosity, and wherein the third porosity forms a nanoporous porosity.

17. The method of claim 16, wherein the annealing the 3D structure comprises heating the 3D structure to 0.99-0.7 of the melting temperature of an alloy to be formed as the alloyed 3D structure.

18. The method of claim 17, wherein the annealing further comprises heating the 3D structure for between 1 hour to 24 hours.

* * * * *